US012517929B2

(12) United States Patent
Rywelska et al.

(10) Patent No.: US 12,517,929 B2
(45) Date of Patent: Jan. 6, 2026

(54) MAPPING DISPARATE DATASETS

(71) Applicant: Wells Fargo Bank N.A., San Francisco, CA (US)

(72) Inventors: Kamila Rywelska, San Francisco, CA (US); Carleton J. Lindgren, San Francisco, CA (US); Manesh Saini, New York, NY (US); Hasan Adem Yilmaz, San Diego, CA (US)

(73) Assignee: Wells Fargo Bank N.A., San Francisco, CA (US)

( * ) Notice: Subject to any disclaimer, the term of this patent is extended or adjusted under 35 U.S.C. 154(b) by 32 days.

(21) Appl. No.: 18/136,577

(22) Filed: Apr. 19, 2023

(65) Prior Publication Data
US 2023/0259534 A1    Aug. 17, 2023

Related U.S. Application Data

(63) Continuation of application No. 17/109,027, filed on Dec. 1, 2020, now Pat. No. 11,657,071.

(60) Provisional application No. 62/989,479, filed on Mar. 13, 2020.

(51) Int. Cl.
*G06F 16/28* (2019.01)
*G06F 16/2457* (2019.01)

(52) U.S. Cl.
CPC ...... *G06F 16/288* (2019.01); *G06F 16/24578* (2019.01); *G06F 16/285* (2019.01)

(58) Field of Classification Search
CPC . G06F 16/288; G06F 16/24578; G06F 16/285
See application file for complete search history.

(56) References Cited

U.S. PATENT DOCUMENTS

| 7,562,088 B2* | 7/2009 | Daga ................. G06F 16/334 |
| 7,971,150 B2 | 6/2011 | Raskutti et al. |
| 10,127,289 B2* | 11/2018 | Manning ............ G06F 16/9535 |
| 10,162,850 B1* | 12/2018 | Jain ..................... G06F 40/30 |
| 10,305,758 B1 | 5/2019 | Bhide et al. |
| 10,552,468 B2* | 2/2020 | Ciulla ................ G06F 16/353 |
| 10,726,208 B2* | 7/2020 | Crossley ............ G06F 40/295 |

(Continued)

OTHER PUBLICATIONS

Drawnonward et al., "What is the fastest substring search algorithm," dated 2010, p. 1-15, retrieved from the Internet on Mar. 1, 2022, URL: https://stackoverflow.com/questions/3183582/what-is-the-fastest-substring-search-algorithm (Year: 2010).

(Continued)

*Primary Examiner* — Miranda Le
(74) *Attorney, Agent, or Firm* — Foley & Lardner LLP

(57) ABSTRACT

Disclosed are systems and method of mapping data entries originating in different systems. A plurality of data entries from different systems are normalized such that they can be compared to each other and mapped, even though the data entries are defined by data fields with differing phrases, descriptive details, and lengths of detail. Data entries may be filtered according to data fields before a mapping operation is employed for mapping. The mapping operation evaluates similarity scores based on the data fields using a combination of exact matching algorithms, dictionary matching algorithms, and text mining algorithms. The mapped data entries and data fields are displayed to a user.

18 Claims, 11 Drawing Sheets

(56) References Cited

U.S. PATENT DOCUMENTS

| | | |
|---|---|---|
| 11,024,300 B2 | 6/2021 | Ban et al. |
| 11,100,283 B2 * | 8/2021 | Ji ................... G06F 40/30 |
| 11,263,557 B2 * | 3/2022 | Yellin ............ G06Q 30/0635 |
| 11,443,380 B2 * | 9/2022 | Cummings .......... G06Q 40/12 |
| 11,593,392 B2 * | 2/2023 | Portisch ............ G06F 16/254 |
| 2008/0046424 A1 | 2/2008 | Horton |
| 2008/0077570 A1 | 3/2008 | Tang et al. |
| 2014/0188780 A1 * | 7/2014 | Guo ............... G06F 16/24573 |
| | | 706/52 |
| 2017/0091320 A1 * | 3/2017 | Psota .............. G06F 16/3337 |
| 2017/0154052 A1 | 6/2017 | Hassanzadeh et al. |
| 2018/0240036 A1 * | 8/2018 | Boada ................. G06N 7/01 |
| 2018/0342328 A1 | 11/2018 | Chan et al. |
| 2019/0266167 A1 * | 8/2019 | Franceschini ......... G06N 5/02 |
| 2019/0303465 A1 | 10/2019 | Shanmugamani et al. |
| 2019/0362290 A1 | 11/2019 | Rogynskyy et al. |
| 2019/0363958 A1 * | 11/2019 | Brunets .............. G06F 16/93 |
| 2019/0370695 A1 * | 12/2019 | Chandwani .......... G06F 18/217 |
| 2020/0065422 A1 * | 2/2020 | Yan ................. G06N 3/082 |
| 2020/0250139 A1 * | 8/2020 | Muffat .............. G06V 30/1988 |
| 2020/0294071 A1 | 9/2020 | Christensen et al. |
| 2020/0342055 A1 * | 10/2020 | Patra ................ G06N 3/048 |
| 2021/0192366 A1 | 6/2021 | Kadambi et al. |
| 2021/0219891 A1 | 7/2021 | Zhu et al. |
| 2021/0224258 A1 | 7/2021 | Faruquie et al. |

OTHER PUBLICATIONS

Stackoverflow, "Simplest way to plot changes in ranking between two ordered lists in R", dated May 1993, p. 1-8, retrieved from the Internet, URL: https://stackoverflow.com/questions/25781284/simplest-way-to-plot-changes-in-ranking-between-two-ordered-lists-in-r (Year: 1993).

* cited by examiner

MAPPING DISPARATE DATASETS

CROSS-REFERENCE TO RELATED APPLICATIONS

This application is a continuation of U.S. patent application Ser. No. 17/109,027 filed Dec. 1, 2020, which claims priority to U.S. Provisional Patent Application No. 62/989,479 titled "MAJOR REQUIREMENT EVALUATION TO PROCESS MAPPING," filed Mar. 13, 2020, the entirety of each of which is hereby incorporated by reference in its entirety.

TECHNICAL FIELD

The present disclosure relates to normalizing datasets and mapping of disparate datasets having varying fields and field types, formats, and/or content.

BACKGROUND

Data may be managed, used, and stored in separate systems. However, there may be cases where data in a first dataset, stored and managed in a first system, may supplement or modify data in a second dataset, stored and managed in a second system. For example, two different users (groups of users, entities, and the like) may independently manage data. While the users manage the data differently (different format, varying language, varying length, varying descriptions of detail) the data from the first dataset may be applied to supplement (benefit or constrain) the data in the second dataset. The data in the first dataset may also supplement data in one or more other datasets. Further, the data in the second dataset may be supplemented by one or more other datasets in addition to the data in the first dataset. Accordingly, an effective mechanism for identifying the interrelatedness of vast amounts of data of varying types is necessary. Manual attempts at determining interrelations between data may be inconsistent, unreliable and/or unfeasible given the volumes of data and the inability of reviewers to spend time tracking changes in the data and re-identifying relationships.

SUMMARY

In one aspect, various embodiments of the disclosure relate to a computer-implemented method, comprising: a memory storing instructions; and a processor configured to execute the instructions to perform operations comprising: retrieving, from a first system, a plurality of first data entries, each of the first data entries comprising a first plurality of data fields; retrieving, from a second system, a plurality of second data entries, each of the second data entries comprising a second plurality of data fields; performing a mapping operation on the first and second data entries, the mapping operation comprising an application of a combination of (i) one or more precision matching algorithms, (ii) one or more concordance matching algorithms, and (iii) one or more text analytics algorithms to the first plurality of data fields and the second plurality of data fields, the mapping operation comprising generating similarity scores for first and second pluralities of data fields; generating, based on the similarity scores and one or more thresholds, a map connecting first data entries to second data entries; and displaying the map indicating which ones of the first data entries are connected to which ones of the second data entries.

Various embodiments of the disclosed inventions related to a computer-implemented method, comprising: obtaining, from a first system, a set of requirements defined by a first set of data fields comprising a first plurality of user-entered free-form phrases; obtaining, from a second system, a set of processes defined by a second set of data fields comprising a second plurality of user-entered free-form phrases; generating, for each process in the set of processes, a subset of the set of requirements impacting the process by performing a mapping operation configured to map processes to requirements by evaluating one or more similarity scores based on the first and second sets of data fields, wherein the mapping operation comprises an application of a combination of (i) one or more exact matching algorithms, (ii) one or more dictionary matching algorithms, and (iii) one or more text mining algorithms to the first set of data fields and the second set of data fields; and displaying a map linking the set of requirements to the set of processes, the map indicating which requirements are connected to which processes.

Various embodiments of the disclosed inventions related to a computer-implemented method, comprising: retrieving, from a first system, a plurality of first data entries, each of the first data entries comprising a first plurality of data fields; retrieving, from a second system, a plurality of second data entries, each of the second data entries comprising a second plurality of data fields; performing a mapping operation on the first and second data entries, the mapping operation comprising an application of a combination of (i) one or more precision matching algorithms, (ii) one or more concordance matching algorithms, and (iii) one or more text analytics algorithms to the first plurality of data fields and the second plurality of data fields, the mapping operation comprising generating similarity scores for first and second pluralities of data fields; generating, based on the similarity scores and one or more thresholds, a map connecting first data entries to second data entries; and displaying the map indicating which ones of the first data entries are connected to which ones of the second data entries.

These and other features, together with the organization and manner of operation thereof, will become apparent from the following detailed description and the accompanying drawings.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
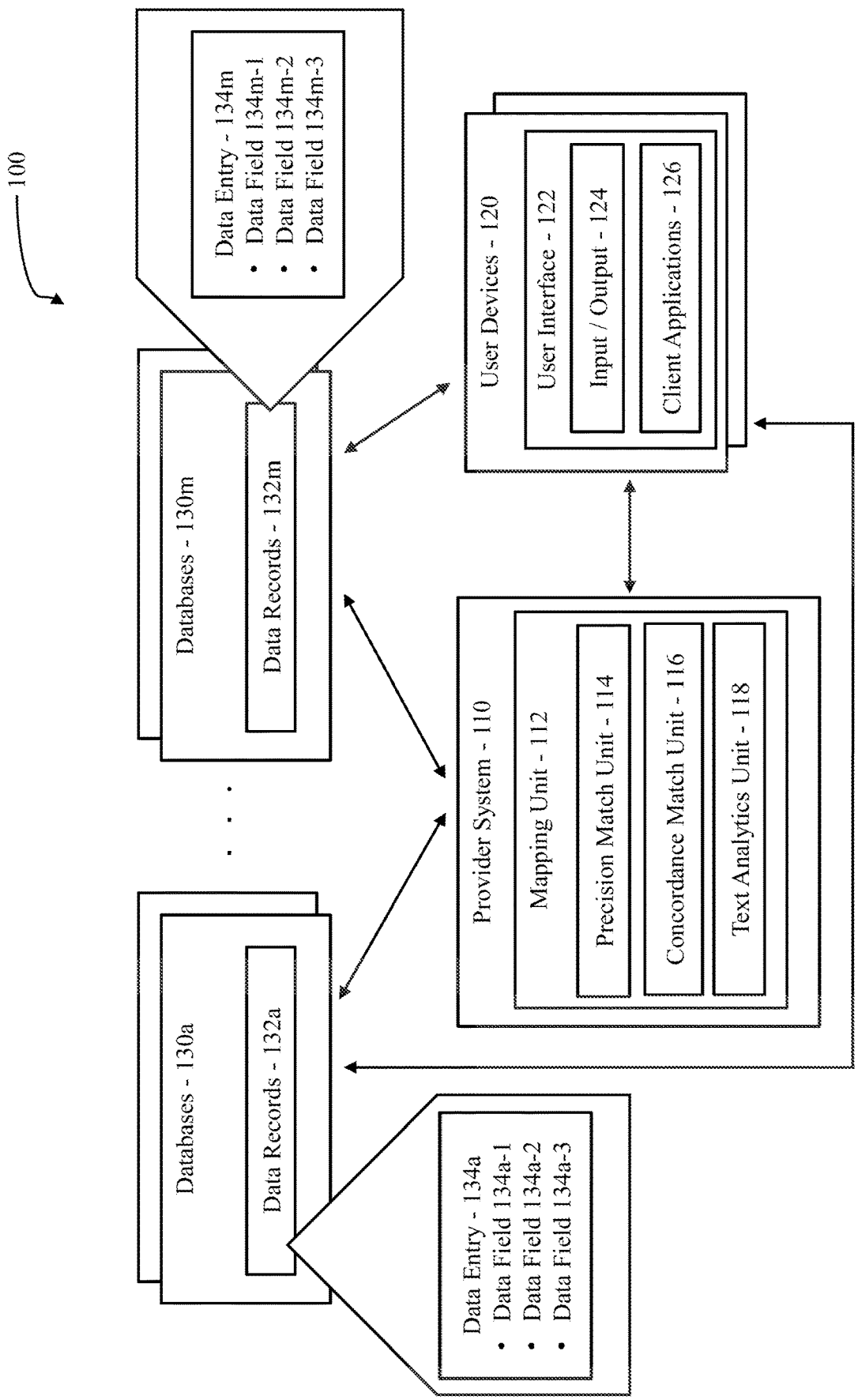
FIG. 1 is a block diagram of an example system that implements a mapping platform and that communicates with databases and user devices, according to potential embodiments.

Hereinafter, example arrangements will be described in more detail with reference to the accompanying drawings, in which like reference numbers refer to like elements throughout. The present disclosure, however, can be embodied in various different forms, and should not be construed as being limited to only the illustrated arrangements herein. Rather, these arrangements are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description.

FIG. 1 depicts a block diagram of an example system 100 that may be used to implement the disclosed mapping approach, according to potential embodiments. The system 100 includes a provider computer system 110 (e.g., a computing system of a service provider), which may be implemented by one or more computing devices. The system 100 may also include one or more databases 130a-130m and user devices 120 (such as smartphones, tablet computers, desktop computers, etc.). The components of the system 100 may be communicably and operatively coupled to each other over a network that permits the direct or indirect exchange of data, values, instructions, messages, and the like (represented by the arrows in FIG. 1).

Each system or device in system 100 may include one or more processors, volatile and non-volatile memories, and network interfaces. The memory may store programming logic that, when executed by the processor, controls the operation of the corresponding computing system or device. The memory may also store data. The network interfaces allow the computing systems and devices to communicate wirelessly or otherwise. The various components of devices in system 100 may be implemented via hardware (e.g., circuitry), software (e.g., executable code), or any combination thereof. Devices and components in FIG. 1 can be added, deleted, integrated, separated, and/or rearranged in various embodiments of the disclosure.

Databases 130a to databases 130m (databases 130) may include data records 132a to data records 132m (data records 132). Each of the databases in databases 130 may store data (in data records 132) associated with a system. The data records 132 contain data entries with associated data fields. The data fields contextually describe the data entry. In one example, an entity may have a first system associated with one or more requirements for various processes, and controls based on those requirements. For instance, a requirement (mailing a letter of approval or denial of a credit application within 30 days) may supplement (constrain) a process (mailing a letter of approval or denial) using a control (mailing within 30 days). The entity may have a second system identifying the processes being controlled. The data associated with the first system may be stored in database 130a, while the data associated with the second system may be stored in database 130m. That is, the data records 132a of the first database 130a may contain data entries 134a, where the data entries are the requirements and controls (e.g., requirement 1, control 1, requirement 2, etc.). In contrast, the data records 132m of the second database 130m may contain process data entries (process 1, process 2, process 3, etc.). The data entries use data fields to describe the data entries. That is, each data entry 134m (process 1) in the data record 132m (a record of processes performed by system 2) may have descriptive data fields 134m-1 to 134m-3. For example, data field 134m-1 may be the process title, data field 134m-2 may be a process descriptor such as comments related to what the process does, and the like. Similarly, each data entry 134a (e.g., requirement 1) in the data record 132a (a record of requirements in system 1) may have descriptive data fields 134a-1 to 134a-3. Data fields of a data entry may include an identifier field, a title field, and various descriptor fields. The content of each data field may be entered by a user (e.g., user-entered free-form data) such as a word or a phrase (e.g., a title), a few sentences or paragraphs (e.g., descriptions of what the requirement, control, or process does), or larger blocks of text. In some implementations, the data fields may comprise non-textual content, such as images and sounds.

Provider system 110 may include a mapping unit 112, which may include an precision match unit 114 that may filter out irrelevant data entries, as discussed further herein, for mapping procedures. The precision match unit 114 may also match data fields of separate systems. Mapping unit 112 may also include a concordance match unit 116 that links terms across various data fields of separate systems. The mapping unit 112 may also include a text analytics unit 118 that may perform one or more various text mining approaches to determine the similarity of the data fields. Provider system 110 may communicate with the user devices 120 when provider system 110 generates a mapping report to be displayed by user devices 120. The mapping report (or "mapping" or "map") may be conveyed to a user using text (e.g., a chart, a table, a column of data entries 134a and an associated "mapped" column of data entries 134m) and/or conveyed to a user graphically (e.g., data entry 134a depicted as a node, mapped to data entry 134m by a link). Further, provider system 110 may communicate with databases 130 to retrieve data records 132 originating from the disparate systems to be used in the mapping of the data entries. The provider system 110 may also communicate with one or more databases 130 in response to generating the mapping report such that the databases can store the mapping report.

User device 120 may include user interfaces 122 that may include input/output components 124 that provide perceptible outputs (such as displays and light sources for visually-perceptible elements, a speaker for audible elements, and haptics for perceptible signaling via touch, etc.) that capture ambient signs and sounds (such as cameras, microphones, etc.), and/or that allow the user to provide inputs (such as a touchscreen, stylus, force sensor for sensing pressure on a display screen, etc.). User interfaces 122 may include biometric sensors such as fingerprint readers, heart monitors that detect cardiovascular signals, iris scanners, face scanners, and so forth. User interfaces 122 may also include location and orientation sensors, such as a GPS device, gyroscope, digital compass, accelerometer, etc. The user device 120 may also include client application 126, such as Internet browsing applications, and applications provided or authorized by the entity implementing or administering the provider system 110. The client application 126 may be used to display a generated mapping report, provide feedback (e.g., additions, deletions, annotations, or other modifications) regarding the generated mapping report, and revise the mapped data displayed in the mapping report. The user device 120 may communicate with the provider system 110 to receive the mapping report generated by the provider system 110. Further, the user device 120 may communicate with one or more databases in the event the user updates and/or modifies a data field originating from the database.

Figure 2:
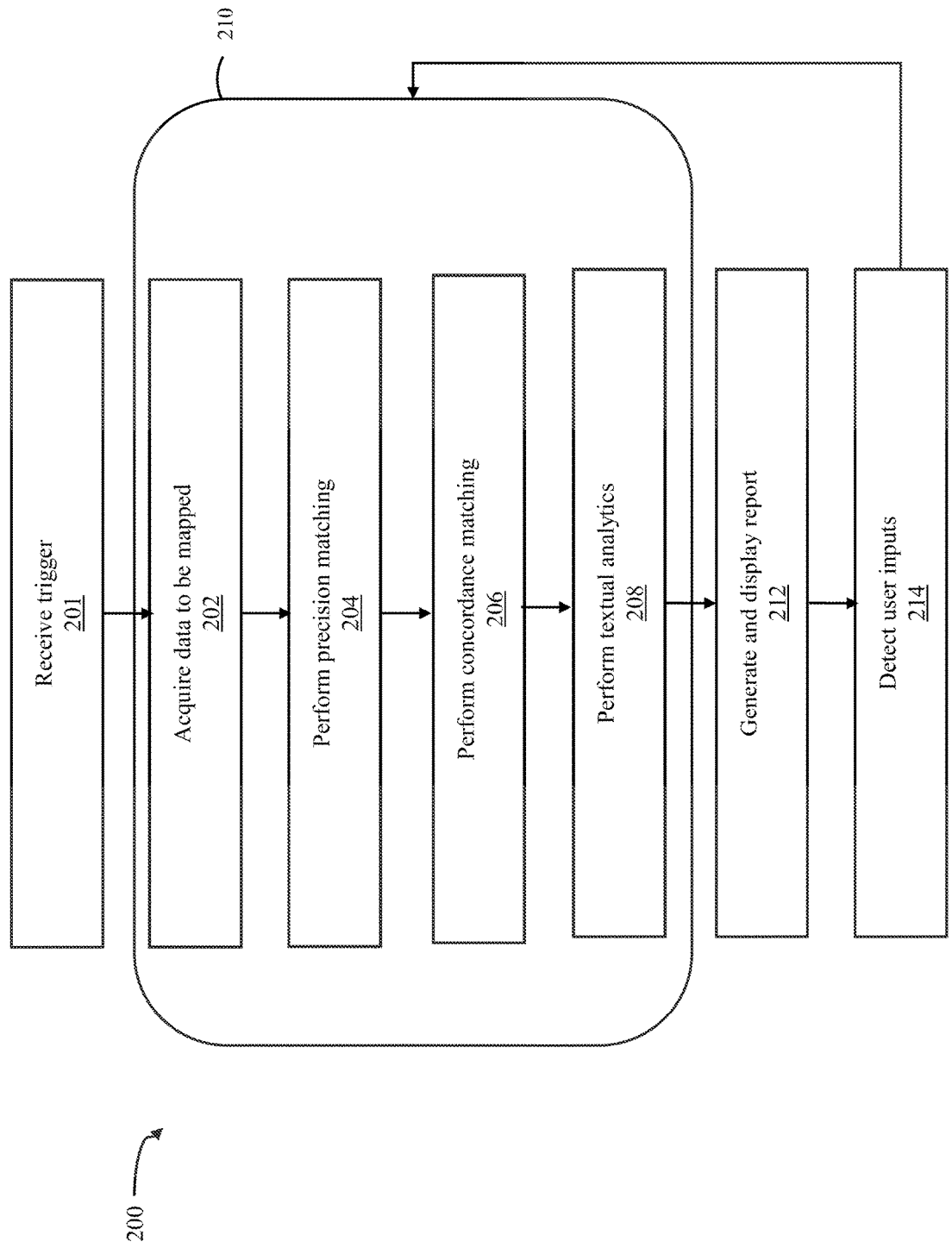
FIG. 2 depicts a high-level overview of a process flow diagram for mapping, for example, material requirements (MRs) to processes, according to potential embodiments.

FIG. 2 depicts a high-level overview of a process flow diagram 200 mapping data from a first system to a second system, according to potential embodiments. The process may be implemented by the provider system 110, with involvement by the mapping unit 112 and various data records 132 from databases 130. A data record 132*a* includes various data entries including the data entry 134*a* and data fields 134*a*-1 to 134*a*-3. A data record 132*m* includes various data entries including the data entry 134*m* and data fields 134*m*-1 to 134*m*-3.

A system (e.g., provider system 110) may execute a mapping procedure based on a trigger. A trigger 201 may be received by the system in response to a user input. Alternatively, a trigger may be received by the system according to a periodic schedule. For example, after each passage of a predetermined time (e.g., every week, month, quarter, four months, six months, or year), the system will receive a trigger such that a new map is generated by the system. The system may also receive triggers based on external messages. For instance, a relevant third party may update data in an external system that supplements data to one or more databases 130, triggering the events in the process flow diagram 200.

During phase 210, data may be acquired for mapping at 202 and various mapping approaches may be employed in various combinations (e.g., precision matching at 204, concordance matching at 206, text analytics at 208). Data may be obtained from data records 132 from one or more databases 130. The described approaches (precision matching 204, concordance matching 206 and text analytics 208) are non-limiting and combinations of the approaches that may be employed. In various embodiments, natural language processing (NLP) or other machine learning techniques may be applied to the data fields.

Data entries from the first system (obtained from database 130*a*) may be mapped to data entries from the second system (obtained from database 130*m*) given that the data fields describe the same concepts. As discussed herein, the descriptions may be conveyed using different words and/or different phrases. Determining that the data fields describe similar concepts (e.g., using matching or other analysis) may indicate that the data fields, although originating separate systems, describe the same topic and are related. Therefore, a user interested in obtaining information about the topic may search the topic and review the related data from the different systems.

A text matching approach may be successful given certain data fields (e.g., titles, where the likelihood of a text match is high) and not successful given other data fields (e.g., descriptors, where sentences may describe the same concepts using different words, phrases, and semantics). Accordingly, different combinations of approaches may be selected for use based on various contextual factors (e.g., length of text in a data field, descriptors of the data). A system (e.g., provider system 110) with a machine learning platform (comprising one or more computing devices configured to apply machine learning techniques) may select one or more approaches including one or more precision matching 204 approaches, one or more concordance matching 206 approaches and/or one or more text analytics 208 approaches, based on, for example, characteristics of the text (e.g., the amount of text) and/or various other features. The combination of these three approaches (precision matching 204, concordance matching 207, and text analytics 208) maps the disparate data entries (defined by the data fields) by connecting them (e.g., linking the data in the disparate data entries). The provider system 110 may generate a mapping report based on the mapping determined during phase 210, and may display a visualization of the related data 212 in the form of an interactive map on a graphical user interface.

One or more users may supply feedback via various inputs detected at 214 based on the mapping report that is generated and displayed data at 212 based on the mapping that resulted from phase 210. The mapping approach of phase 210 performs mapping based on assumptions determined by various artificially intelligent approaches. Accordingly, the assumptions in phase 210 may be incorrect. The user may correct the assumptions made in phase 210 by providing user feedback detected at 214. For example, a text mining approach may have determined that two different datasets are related when they may not actually be related. One or more users may check the taxonomies determined by the mapping performed in phase 210. The user feedback allows a user to review the mapping performed in phase 210 and address limitations that are created by the mapping approaches (e.g., incorrect assumptions) and limitations created by users (e.g., gaps in data field descriptions such as missing data field entries). Users may supplement the identified data fields to increase the accuracy of the mapping performed in phase 210 through user feedback. Phase 210 may be re-run based on the user-supplemented information supplied during at 214. User feedback may be submitted via the user interface 122 of the user device 120 (via, e.g., the client application 126 and input/output components 124). Further, the user feedback allows one or more users to accept, store, and/or reject mappings between specific data.

User feedback detected at 214 may be incorporated into the mapping performed in phase 210 to enable or enhance supervised learning techniques. In a supervised system, known input/output pairs can be used to train the system. The input/output pairs may be provided by users reading data fields and determining whether data is related. At phase 210, the system maps the data fields using various approaches and/or combinations of approaches. Accordingly, for a given input, a system-mapped output (e.g., whether the data is related) can be compared to a user-determined output. Based on the user feedback the system can change how the mapping is performed in subsequent runs (e.g., the mapping approaches, the thresholds of string similarity, and the string constructions, as discussed herein). Thus, the system may learn how to map the processes more accurately based on feedback on the mapping model.

A series of filtering steps may be performed in phase 210 to ease the computational burden of downstream mapping approaches. For example, certain data (defined by data fields) in a dataset may be filtered out of the dataset before or after any of the operations performed in phase 210, as further discussed below with respect to FIG. 3.

Figure 3:
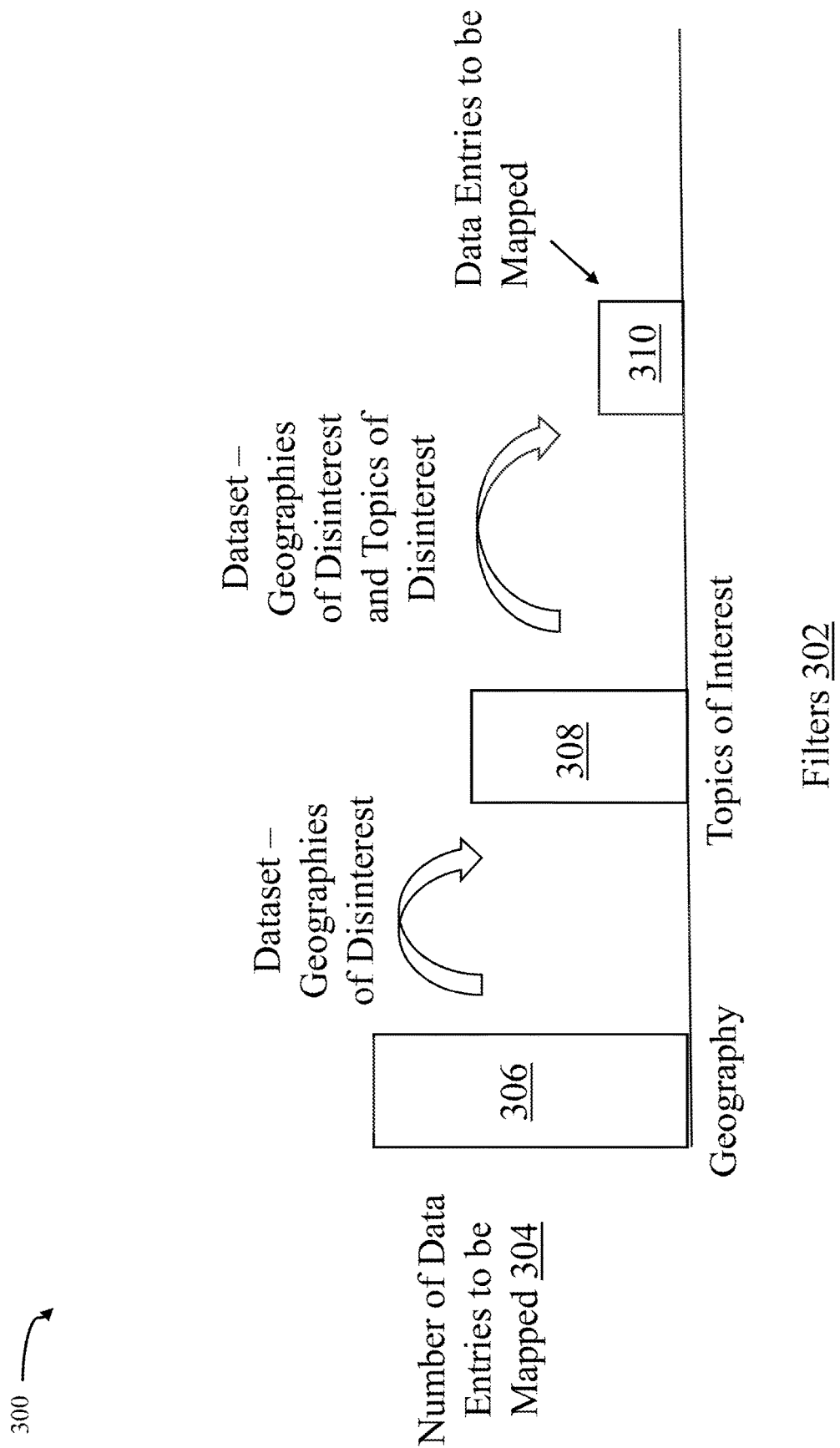
FIG. 3 depicts a high-level overview of an example approach to filtering data entries based on data fields, according to potential embodiments.

FIG. 3 provides a high-level overview of in a graph 300 depicting filtering of data, according to potential embodiments. As shown by graph 300, various filters 302 may be implemented to reduce the data entries to be mapped 304. Given a dataset 306 from a system, a data entry containing a data field describing a certain geography may be filtered out of the dataset. For instance, a requirement and control governing a process in a particular state may not apply to a different state. Therefore, data associated with all states but for a particular state may be filtered out of various datasets. Additionally or alternatively, all data associated with a particular state may be filtered out. One filtering approach that may act as a filter 302 is precision matching. For instance, data fields that match the word "California" and/or "CA" (i.e., the postal abbreviation for California) may be passed through the filter, while data fields with other state words may be filtered out. The data in 308 may be all of the data associated with "California." Accordingly, the number of data entries to be mapped in 308 is less than the data entries in 306. The data entries in 308 may be further filtered using the same filtering approach (e.g., precision matching) or a different filtering approach (e.g., concordance matching) to produce an even small dataset 310 with fewer numbers of data entries to be mapped 304. For example, the data in 308 may be filtered according to topics of interest to one or more particular users. For instance, the data associated with credit application notices (the requirements, controls and process data related to credit applications) may not be of interest in determining data associated with lending (requirements, controls and process data related to lending).

Figure 4:
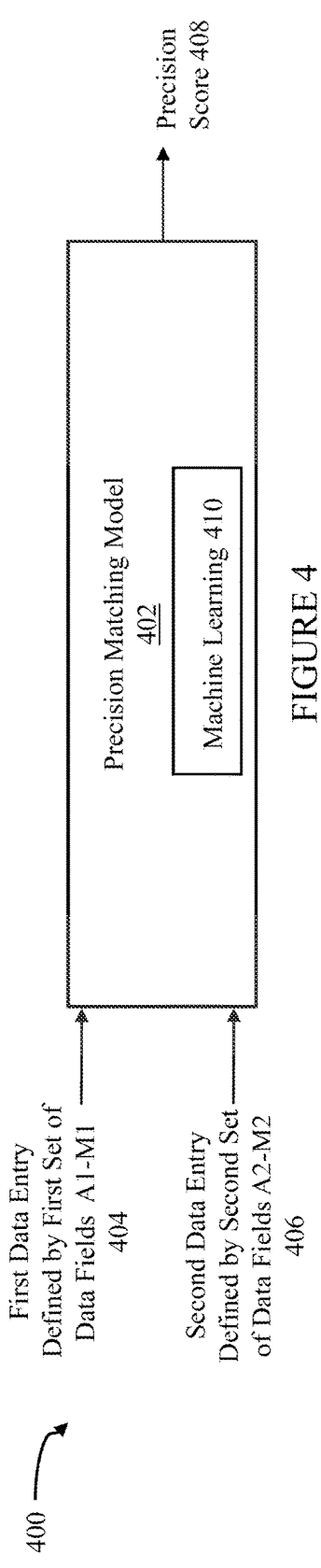
FIG. 4 depicts a high-level overview of a system mapping procedure using exact matching or other precision-based comparative analytics, according to potential embodiments.

FIG. 4 depicts a high-level overview of a system 400 performing precision matching mapping operations, according to potential embodiments. The system 400 may be implemented by the provider system 110, with involvement by the mapping unit 112 (e.g., precision match unit 114) and data records 132 from databases 130. A precision matching model 402 may be, for instance, an exact matching model that is implemented to compare a first data entry defined by data fields 404 (e.g., data field A1 to data field M1), with a second data entry defined by data fields 406 (e.g., data field A2 to data field M2) to determine the similarity of the content in the data fields. Data fields that can be matched using precision matching include, but are not limited to, title fields and descriptor fields. The precision matching model 402 may be performed by any suitable means. In an example, text in each data field of the first data entry that is exactly matched to text in a data field of the second data entry receives a certain (variable) number of points, with the number of points potentially varying according to particular data fields, their values, their characteristics (such as length), and/or other factors. The number of points for each of the data fields in each of the entries may be combined to determine a precision score 408. In some embodiments, combinations of points may comprise the addition of points, as potentially weighted according to various factors (e.g., based on correlations of certain data). If the precision score 408 satisfies one or more thresholds, the system (e.g., provider system 110) may determine, based on the precision matching model 402, that the first data entry defined by the first set of data fields is related to the second data entry defined by the second set of data fields. That is, the first data entry 404 and the second data entry 406 may be mapped. In some embodiments, the provider system 110 may supplement either the first data entry 404 and/or the second data entry 406 with a third data entry. The content from the data fields of the third data entry may be matched with the data fields of the first data entry 404 and/or the second data entry 406.

In some instances, the number of data fields that exactly match (or match with differences deemed insignificant under certain circumstances, such as differences in use of whitespace, presence or lack of certain characters like dashes, single-character differences corresponding with common misspellings of certain terms, etc.) in the first data entry 404 and the second data entry 406 may be known. That is, the precision score 408 may be known for a first data entry 404 and a second data entry 406. In these instances, supervised learning or other machine learning techniques 410 (e.g., supervised learning) may ensure that the number of known matches (expected score) for the first data entry 404 and the second data entry 406 are determined by the precision score 408. In the event precision score 408 does not match the expected score, the precision matching model 402 may be tuned or otherwise recalibrated.

Figure 5:
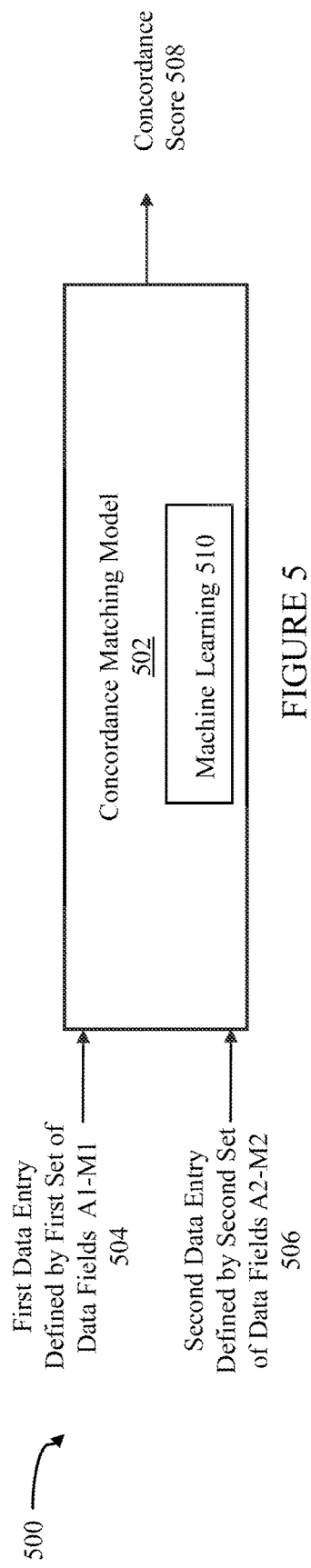
FIG. 5 depicts a high-level overview of a system mapping procedure using dictionary matching or other concordance-based comparative analytics, according to potential embodiments.

FIG. 5 depicts a high-level overview of a system 500 performing concordance matching mapping procedures, according to potential embodiments. The system 500 may be implemented by the provider system 110, with involvement by the mapping unit 112 (e.g., concordance match unit 116) and data records 132 from one or more databases 130. A concordance matching model 502 may be implemented to compare a first data entry defined by data fields 504 (e.g., data field A1 to data field M1) with a second data entry defined by data fields 506 (e.g., data field A2 to data field M2) to determine the similarity of the content in the data fields. That is, string in the first data entry are compared with strings in the second data entry to a dictionary database (or library). The dictionary database may indicate that the strings in the first data entry match the strings in the second data entry in meaning. Accordingly, while the strings in the data entries may not match, there is a link between the strings in each of the data entries. The dictionary database may be a well known dictionary. Additionally or alternatively, the dictionary database may be a user-generated dictionary database, or a combination of a well known dictionary and supplemented user-generated terms. Data fields that can be matched using concordance matching include, but are not limited to, title fields and descriptor fields.

The concordance matching model 502 may include analogizing data fields of text across various data fields of various data entries (e.g., data field A1 of a first data entry compared to data field A2 of a second data entry). Concordance matching model 502 may be applied by any suitable means. In an example, dictionary matching may associate (or connect) words/strings of text in various datasets that have the same and/or similar meaning. For instance, the phrases "charge card" and "credit card" may be connected in a concordance match because the two phrases have the same meaning and/or represent the same concept. In contrast, "charge card" and "credit card" would not be matched under precision matching because the exact words to describe the same concept are different.

Text and/or phrases that are analogized between data fields of the first data entry 504 and data fields of the second data entry 506 may receive a variable number of points. The number of points for each of the data fields may be combined to determine a concordance score 508. In some embodiments, combination of points may comprise an addition of points, as potentially weighted according to various factors (e.g., based on correlations of certain data). If the concordance score 508 satisfies one or more thresholds, the system (e.g., provider system 110) may determine, based on concordance matching, that the first data entry 504 and the second data entry 506 are related. That is, the first data entry 504 and the second data entry 506 may be mapped. In some embodiments, the provider system 110 may supplement either the first data entry 504 and/or the second data entry 506 with a third data entry. The content from the data fields of the third data entry may be compared with the data fields of the first data entry 504 and/or the second data entry 506.

In some instances, the number of data fields that are concordance matched in the first data entry 504 and the second data entry 506 field may be known. That is, the concordance score 508 may be known for a first data entry 504 and a second data entry 506. In these instances, machine learning 510 (e.g., supervised learning) may ensure that the number of known matches (expected score) for the first data entry 404 and the second data entry 406 are determined by the concordance matching 502 score 508. In the event concordance score 508 does not match the expected score, the dictionary used in the concordance matching model may be tuned or otherwise recalibrated.

Figure 6:
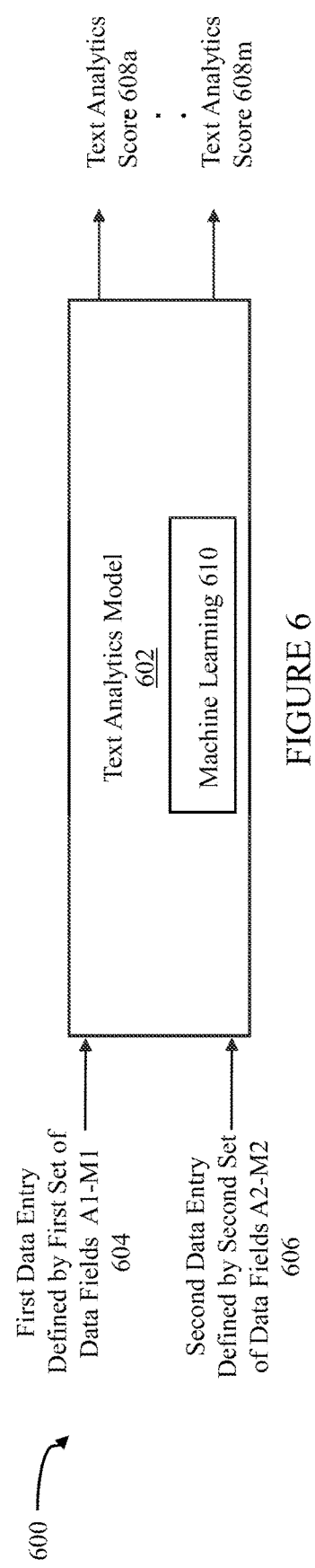
FIG. 6 depicts a high-level overview of a system mapping procedure using text mining or other text analytics, according to potential embodiments.

FIG. 6 depicts a high-level overview of a system 600 performing text analytics mapping procedures employing text mining or other analytics, according to potential embodiments. The system 600 may be implemented by the provider system 110, with involvement by the mapping unit 112 (e.g., text analytics unit 118) and data records 132 from databases 130. Text in each of the data fields may be mined by using text mining approaches to measure text similarity and/or context similarity between the data fields of the first entry 604 and data fields of the second entry 606. Applying a text analytics model 602 to the various data fields is a mechanism for determining the similarity of the data entries defined by the data fields.

In one instance, the data fields of the first data entry 604 may be aggregated into a first document, and the data fields of the second data entry 606 may be aggregated into a second document. The documents (e.g., the first document and the second document) may be evaluated using intelligent contextual mapping. For example, a first document may use the phrase "the king and his wife" but a second document may use the phrase "the king and queen." Although the phrases are different, based on the context of the phrase, the provider system 120 may determine that the first document and the second document are referring to the same concept. Accordingly, the first document and the second document may be related, and the first data entry 604 and second data entry 606 responsible for the creation of the first document and second document may be mapped.

Alternatively, the data fields of the first entry 604 and the second entry 606 may not be aggregated into unique documents. Each data field of the first entry 604 may be compared to a data field in the second data entry 606. Text analytics model 602 may be applied to evaluate the relatedness of each of the data fields to produce a text analytics score 608. For example, data field A1 in data entry 604 may be text mined and compared to data field A2 in data entry 606 to produce a text analytics score 608a. Further, data field B1 in data entry 604 may be text mined and compared to data field B2 in data entry 606 to produce a text analytics score 608b. In the event any score 608a-m satisfies a threshold, the provider system 120 may determine that the first data entry 604 and the second data entry 606 are related. Alternatively, a predetermined number of scores 608 (e.g., a certain fraction of the scores) may need to satisfy a threshold for the provider system 120 to determine that the first data entry 604 and the second data entry 606 are related.

Algorithms, models, and neural networks such as Levenshtein distance, latent semantic index (LSI), cosine similarity, FuzzyWuzzy algorithms, n-grams, topic modeling with network regularization, word2vec, soft cosine similarity, doc2vec, latent Dirichlet allocation (LDA), Jensen-Shannon divergence, and Word Mover's Distance (WMD), and the like may be used for text analytics model 602 and applied to various documents and/or data fields to measure the similarity of the text in various documents and/or data fields.

One text mining algorithm, the Levenshtein distance algorithm, is a FuzzyWuzzy algorithm. Fuzzy string matching algorithms find strings that match a given pattern. The Levenshtein distance algorithm assesses the text similarity of two strings and evaluates a similarity score for combinations of strings in the text. For example, the Levenshtein distance algorithm evaluates the similarity of keywords contained within the document. In an example of the Levenstein distance algorithm, strings in the first document (based on strings from data fields of the first data entry 604) may be compared to strings in the second document (based on strings from data fields of the second data entry 606). A score between 0 and 1 may be determined such that a score of 1 is produced if the compared strings are identical, and a score of 0 is produced if there are no common characters between strings.

The LSI algorithm may be an alternate algorithm (or an approach) employed in text analytics model 602. LSI is a topic-modeling algorithm, where LSI determines the similarity of strings by associating string relationships (e.g., relationships between a first string and a second string) based on content and/or topics in a certain proximity to the first string and second string. Generally, strings within a certain proximity to other strings are descriptions. For instance, five strings before and after a string (e.g., a string keyword) may describe features of the string, characteristics of the string, and the like. Thus, topics with associated string descriptions may be generated by examining strings around a string keyword. For example, LSI groups related strings within a document to create topics for each document.

In a simple example, an LSI algorithm may determine that the word "client" may be associated with the word "customer" and that the two words should receive a high string similarity score. The LSI algorithm may determine that "client' and "customer" are associated by evaluating strings around the strings "client" and customer." For example, common strings that may surround the strings "client" and customer" may include "satisfaction", "priority", "support", and the like. Therefore, the LSI algorithm may determine that the strings are describing the same content based on the strings around the strings "customer" and "client."

In performing LSI, strings in a document may be transformed into a matrix by creating string vectors of terms in the document. Singular value decomposition may be employed to obtain latent topics from the matrix. Cosine similarity may be applied to the string vectors of the matrix to calculate an angle between the string vectors in the matrix. For example, the angle between the data field in the first data entry 604 and the data field in the second data entry 606 may be determined. A ninety-degree angle may indicate that there is no similarity between the vectors, while total similarity may be expressed by a zero degree angle because the strings would completely overlap. The LSI algorithm may generate a score between ±1 based on the results of the cosine similarity evaluations, where +1 indicates that the strings are identical in their context, and −1 indicates that there is nothing that relates the strings to that content.

LDA is a different topic-modeling algorithm that may be employed by text analytics model 602. Topics in a document may be modeled according to a Dirichlet distribution of topics, and each topic may be described by a Dirichlet distribution of words. Jean Shannon Distance may be used to measure the similarity of the document distributions to generate a similarity score between pairs of documents.

Additionally or alternatively, a Word2Vec neural network may be employed as part of text analytics model 602. Word2Vec neural networks may take a document of string inputs (e.g., various data fields from the first data entry 604 and the second data entry 606) and return vectors, the vectors grouping strings together based on similarity. In a simple example, a neural network may group "cat" with "kitten" and group "dog" with "puppy." The neural network can predict the similarity of strings based on past appearances of the string. The neural network may learn relationships between the strings by any appropriate supervised or unsupervised learning methods. Word2Vec operates by assigning a numerical representation to each string and comparing context similarity between the strings in a document using the numerical representations of the strings.

Cosine similarity may be applied to the vector outputs of the Word2Vec neural networks to calculate an angle between the string vectors. A ninety-degree angle may indicate that there is no similarity between the vectors, while total similarity may be expressed by a zero degree angle because the strings would completely overlap. The LSI algorithm may generate a score between ±1 based on the results of the cosine similarity evaluations, where +1 indicates that the strings are identical in their context, and −1 indicates that there is nothing that relates the strings to that content. Doc2Vec, an extension of Word2Vec, may be used to determine the similarity between sentences and/or documents, as opposed to the word similarity analysis in Word2Vec.

WMD may be an additional approach employed by text analytics model 602. WMD creates a weighted cloud of words from two documents and measures the distances between words in the weighted cloud. WMD measures the similarity of documents by calculating the distance between the words. For example, the number of transformations from one string to achieve a second string may be determined. The similarity of the documents may be quantified by the distances between the two documents, where the distances between the two documents is represented by the transformations necessary to transform the strings in one document to similar strings in the second document.

The approaches discussed herein may measure various levels of string similarity. For example, maximum string similarity scores may be determined by evaluating the similarity of entire strings. Additionally or alternatively, partial string similarity scores may be determined by evaluating the similarity of portions of strings. For example, a portion of a string may be compared to one or more portions of other strings.

Additionally or alternatively, string constructions may be evaluated to determine the similarities of strings. In an example, a string may be considered a sentence. The token sort approach involves creating tokens associated with several characters in the string, alphabetizing the tokens, and subsequently analyzing the original string with respect to the alphabetized token string. For instance, the string "peanuts and cracker jacks" may appear dissimilar to the string "crackerjacks and peanuts" when in fact the strings are the same, but merely in dissimilar constructions. Considering other constructions of the string may highlight the similarity of the strings. For example, using the token sort approach, both strings would result in "and cracker jacks peanuts."

In some embodiments, text analytics model 602 may chain together or otherwise combine various algorithms (or approaches) to measure the similarity of text in various documents and/or data fields, utilizing inherent strengths of various algorithms to mitigate inherent weaknesses of other algorithms. In example embodiments, three different approaches may be applied (e.g., Levenshtein distance, LSI, and cosine similarity) to obtain a maximum similarity score 608. The Levenshtein distance may be an example of a superior algorithm for evaluating text similarity between two text strings. The LSI approach may be used in conjunction with cosine similarity to numerically assess context similarity across strings in the first document and strings in the second document. Accordingly, the similarity of strings and contexts of various data fields and/or documents may be assessed by employing the chained Levenshtein algorithm, LSI, and cosine similarity.

In some instances, machine learning 610 (e.g., supervised learning) may be applied to the documents and/or text to ensure for instance, that the text analytics model 602 is making correct assumptions and creating the correct topics. In an example, an n-gram analysis may be performed to evaluate whether the text analytics model 602 is creating the correct topics. An n-gram is a continuous sequence of n-items in text. Among others, an n-gram may be a sequence of characters, words, or syllables in a text. An n-gram analysis may evaluate an n-gram's frequency in a text. The analysis of the frequency of the n-gram in the text may indicate that certain data fields and/or certain documents contain a certain number of topics. For instance, if an n-gram is repeated once, the n-gram is likely not a topic. In contrast if an n-gram is repeated multiple times, the n-gram is likely a topic. The results of the n-gram analysis may be compared to the number of topics determined in the text mining approaches employed in text analytics model 602 to verify that the text mining approaches correctly determined the number of topics (and the topics). The n-gram analysis results may be used to modify the number of topics (and the topics) determined by the text mining approach in text analytics 602. The adaptation of the text mining approach based on the n-gram analysis is an example of supervised learning.

Figure 7:
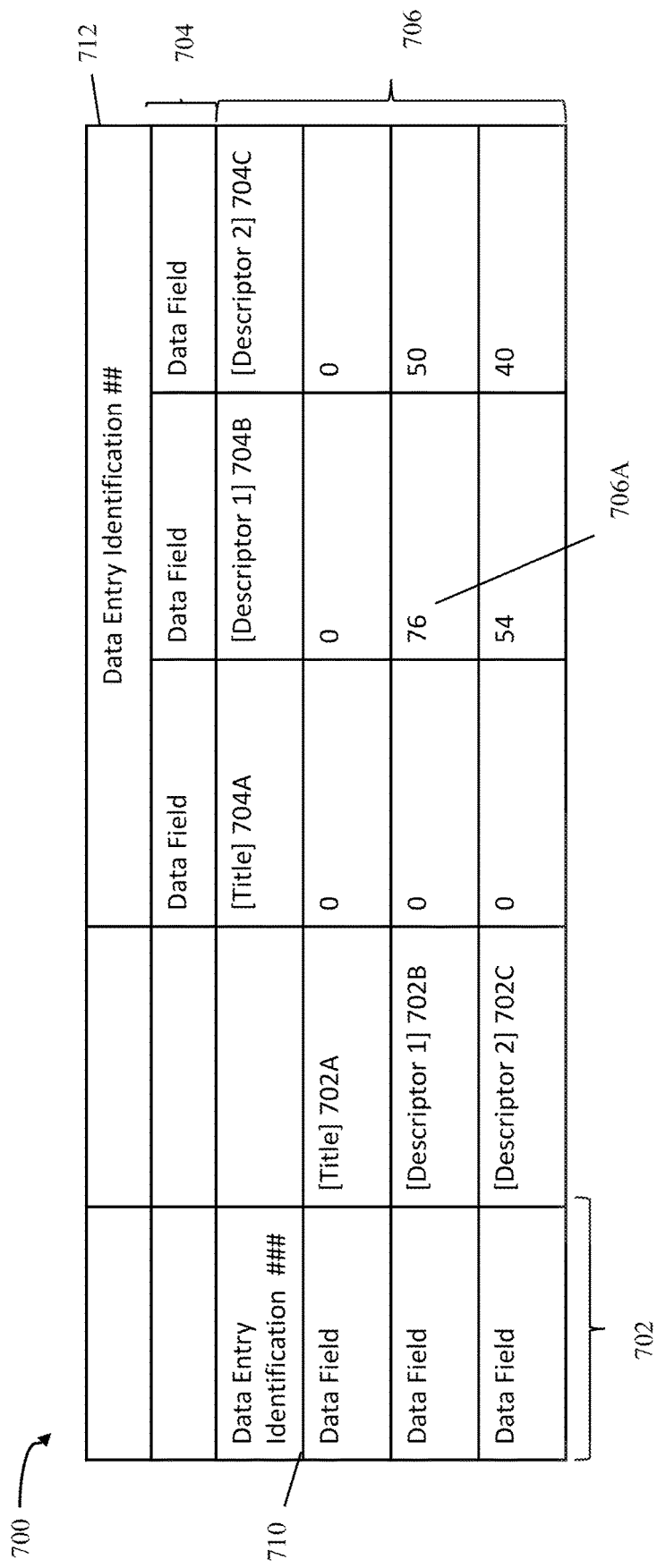
FIG. 7 is an example of a system mapping procedure using similarity scores, according to potential embodiments.

FIG. 7 is an example 700 of a system mapping data entries, according to potential embodiments. As shown, various data fields 702 and 704 represent a first data entry 712 and a second data entry 710 respectively. Each of the data fields may contain text 702A-702C and 704A-704C.

Figure 8:
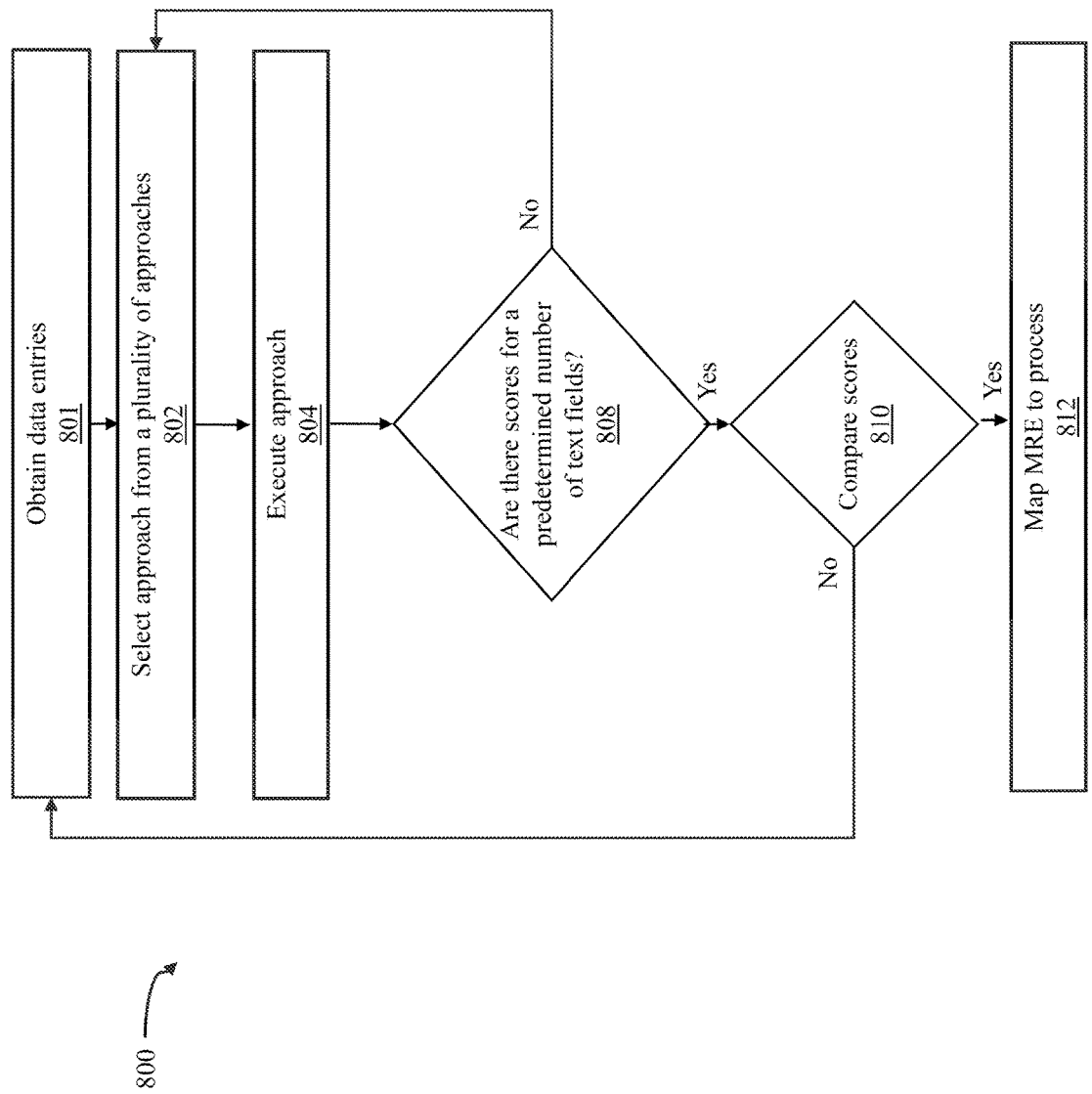
FIG. 8 depicts a high-level overview of a process flow diagram for determining whether data entries should be mapped based on relatedness, according to potential embodiments.

In an example, the Levenshtein distance algorithm may be selected (e.g., as the selecting mapping approach 802 from a plurality of approaches in FIG. 8) to determine the similarities of the data fields 702 and 704. The Levenshtein distance algorithm may advantageously be employed when assessing the similarity of keywords in various documents. Generally, the Levenshtein algorithm does not perform well when employed in long documents. Further, the Levenshtein algorithm generally does not perform well when assessing one word.

The Levenshtein distance algorithm may be employed on the various data fields of the data entries. That is, the Levenshtein distance algorithm may evaluate the similarity of Data Field 702A to Data Field 704A. Data Fields 702 and 704 are titles. In an example, the title of the Data Entry 710 and Data Entry 712 may be one word. Thus, because the Levenshtein distance algorithm does not perform well with one word assessments, the Levenshtein distance algorithm determined that the Data Field 702A and 704A were not similar. The Levenshtein distance algorithm may evaluate the similarity of Data fields 702B and 704B, 702B and 704C, 702C and 704B, and 702C and 704C, producing similarity scores for each of the evaluated data fields. The similarity scores are shown in table 706.

Each of the scores stored in table 706 may be compared to a threshold. As discussed herein, the threshold may be determined by a user and/or dynamically determined by the system. In the event that a predetermined number of scores in table 706 exceeds the threshold, the system may determine that data entries are related and therefore should be mapped. In some embodiments, the number of predetermined scores may be one. That is, in the event any score in the table 706 exceeds the threshold, the data entries should be mapped. In the current example, the threshold is 60. As shown, score 706A exceeds 60. Accordingly, the system will map the data entry 710 and data entry 712.

FIG. 8 depicts a high level overview of a process flow diagram 800 for determining whether data entries from disparate systems are related and should be mapped, according to potential embodiments. A system (e.g., provider system 110) may, at 801, obtain at least two data entries from disparate systems. A dataset from a first system may contain data entries, each data entry containing data fields. Similarly, a dataset from a second system may contain data entries, each data entry containing data fields. As discussed herein, the level of description, length of text and phraseology may differ between the two systems such that the data fields originating from the two systems may contain different levels of description, lengths of text, and phrases. In some embodiments, the system may obtain data entries to be analyzed based on a user input. In other embodiments, the system may obtain data entries randomly or pseudo-randomly from a dataset.

Precision matching, concordance matching, and text analytics may be employed to determine the similarities of the obtained data entries. The similarity of the data entries is assessed in determining whether the data entries are related and subsequently should be mapped. Various mapping algorithms (or approaches) may have inherent weaknesses and strengths that depend on available information. For example, the Levenshtein distance algorithm may be strong at evaluating the similarity of strings in a subset of text, however, the Levenshtein distance algorithm may not be strong at evaluating long documents. In contrast, the LDA algorithm uses the available text in documents to determine the similarity of the documents making the LDA algorithm better suited for longer documents. Accordingly, the best approach for the data field data may differ depending on the data entries evaluated because the data fields of each entry are different.

At 802, a mapping approach may be selected from a plurality of approaches. The mapping approaches may be used to determine whether the data entries from step 801 can be mapped. As discussed herein, various mapping approaches have various inherent strengths and weaknesses. Mapping approaches include any suitable means of precision text matching, any suitable means of concordance matching, and text analytics methods including Levenshtein distance, LSI, cosine similarity, FuzzyWuzzy algorithms, n-grams, topic modeling with network regularization, word2vec, soft cosine similarity, doc2vec, LDA, Jensen-Shannon divergence, WMD, and the like. Mapping the data fields of the data entries may be determined by using one or more mapping approaches on the various data fields of the data entries.

In some embodiments, a mapping approach may be randomly selected (and results evaluated to determine which approaches or combinations of approaches were most effective for particular datasets). In other embodiments, a user may select an approach from the plurality of approaches. In other embodiments, a mapping approach may be selected from a predetermined sequence of mapping approaches. For example, mapping approaches may be chained together such that the sequence of mapping approaches are selected in selection 802. For instance, the LDA approach may be chained to the Jean Shannon Distance approach such when the LDA approach is selected in 802, the Jean Shannon Distance approach is also selected. It may be beneficial to chain these two approaches together such that a numerical score is generated. The approaches may be chained according to inputs from one or more users and/or dynamically determined by the system (e.g., provider system 110). In other embodiments, the same mapping approach may be used for each of the data fields (or documents) of the data entries. In other embodiments, mapping approaches may be selected for certain data fields (or documents) based on the inherent strengths of that approach.

Mapping approaches may score string similarity based on various levels of string similarities. For example, as discussed herein, the mapping approaches may evaluate similarity based on maximum string similarity or partial string similarity. Further, the mapping approaches may evaluate string similarity based on various string constructions (e.g., using token string sort to evaluate similarities of various string constructions).

A system (e.g., the provider system 110) may execute the selected approach 804 (with the string similarity and/or construction modifications). For example, if the LSI approach is selected for text mining, the LSI approach will be executed as discussed herein. In cases where approaches are chained, the system may execute the chained approaches consecutively. As discussed herein, each of the approaches may generate a similarity score (e.g., score 408, score 508, scores 608a-608m).

Evaluation 808 is performed by the system to determine whether a predetermined number of data fields have been scored. In some embodiments, all of the data fields contained in data entries may be scored. In alternate embodiments, only a certain number of select data fields may be scored. That is, the mapping approaches do not need to be executed on all of the data fields. For example, in some cases it may be beneficial to map only one descriptor field in each of the data entries.

In the event the predetermined number of data fields have not been mapped according to one or more mapping approaches, the system may select a mapping approach from a plurality of approaches 802. The newly selected mapping approach may be a new mapping approach determined randomly and/or according to a sequence (e.g., first LDA mapping will be performed, then Levenshtein distance mapping will be performed, etc.). In the event the predetermined number of data fields have been mapping according to one or more mapping approaches, scores determined for the various data fields may be compared to one or more thresholds. Alternatively, the scores may be compared to one or more thresholds after the mapping approach has been executed at 804.

The threshold may be user determined and/or dynamically determined by the system. In the event the score satisfies the threshold, the system may determine that the data entries contain similar enough information that they may be mapped. That is, the data entries from the two different systems are describing the same information.

Figure 9:
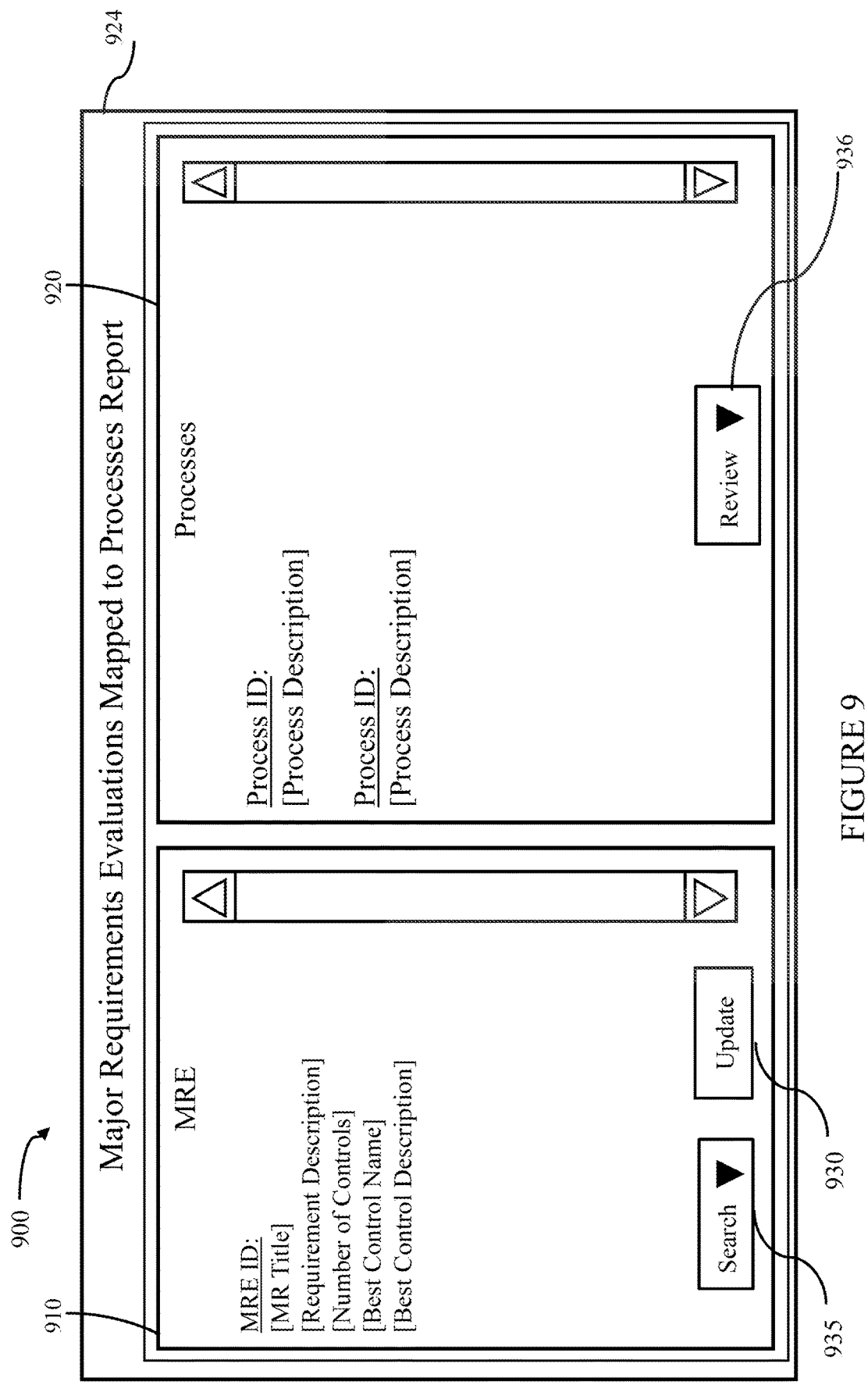
FIG. 9 depicts an example user interface displaying the mapping of particular requirement evaluations to particular processes, according to potential embodiments.

Referring to FIG. 9, an example graphical user interface ("GUI") 900 may be presented (e.g., via a user device 120 and/or provider system 110) illustrating the mapping of data entries originating from disparate systems. As discussed herein, an entity may have a first system associated with one or more requirements (and controls) for various processes. The entity may have a separate system associated with the processes controlled by the requirements. For instance, a requirement (mailing a letter of approval or denial of a credit application within 30 days) may supplement (constrain) a process (mailing a letter of approval or denial) using a control (mailing within 30 days). The following figures describe an example GUI mapping material requirements (MRs), controls, material requirement evaluations (MREs), and processes, although the processes disclosed herein are not limited to such mapping. An MRE is a mechanism for a user to evaluate requirements and associated controls. For instance, a user may evaluate the requirement and control in the first system.

Frame 910 in GUI 900 shows an MRE and information related to the MRE (e.g., MR information and control information such as MR title, MR description, number of controls, best control name, best control description). A user may interact with an interactive button such as the "Search" button 935. Button 935 may be a drop down menu that allows a user to search for a particular MRE, the MRE to be displayed in frame 910. In alternate embodiments, button 935 may be configured such that a user can interact with button 935 by typing a MRE identification instead of searching for the MRE identification in a list of MREs. When the user interacts with the button 935 to select an MRE to be displayed, processes described herein may be triggered (e.g., process 200 in FIG. 2, process 400 in FIG. 4, process 500 in FIG. 5, process 600 in FIG. 6 and/or process 800 in FIG. 8). A user may also interact with an interactive "Update" button 930 if the user wants to manually modify the MRE displayed in frame 910.

The displayed report 924 may be the side-by-side comparison of the MRE frame 910 and the process frame 920. Frame 920 displays the processes that have been mapped to the MRE in frame 910. A user may interact with the interactive "Review" button 936 if the user wants to review one or more portions of the mapping, as discussed further in FIG. 12.

Figure 10:
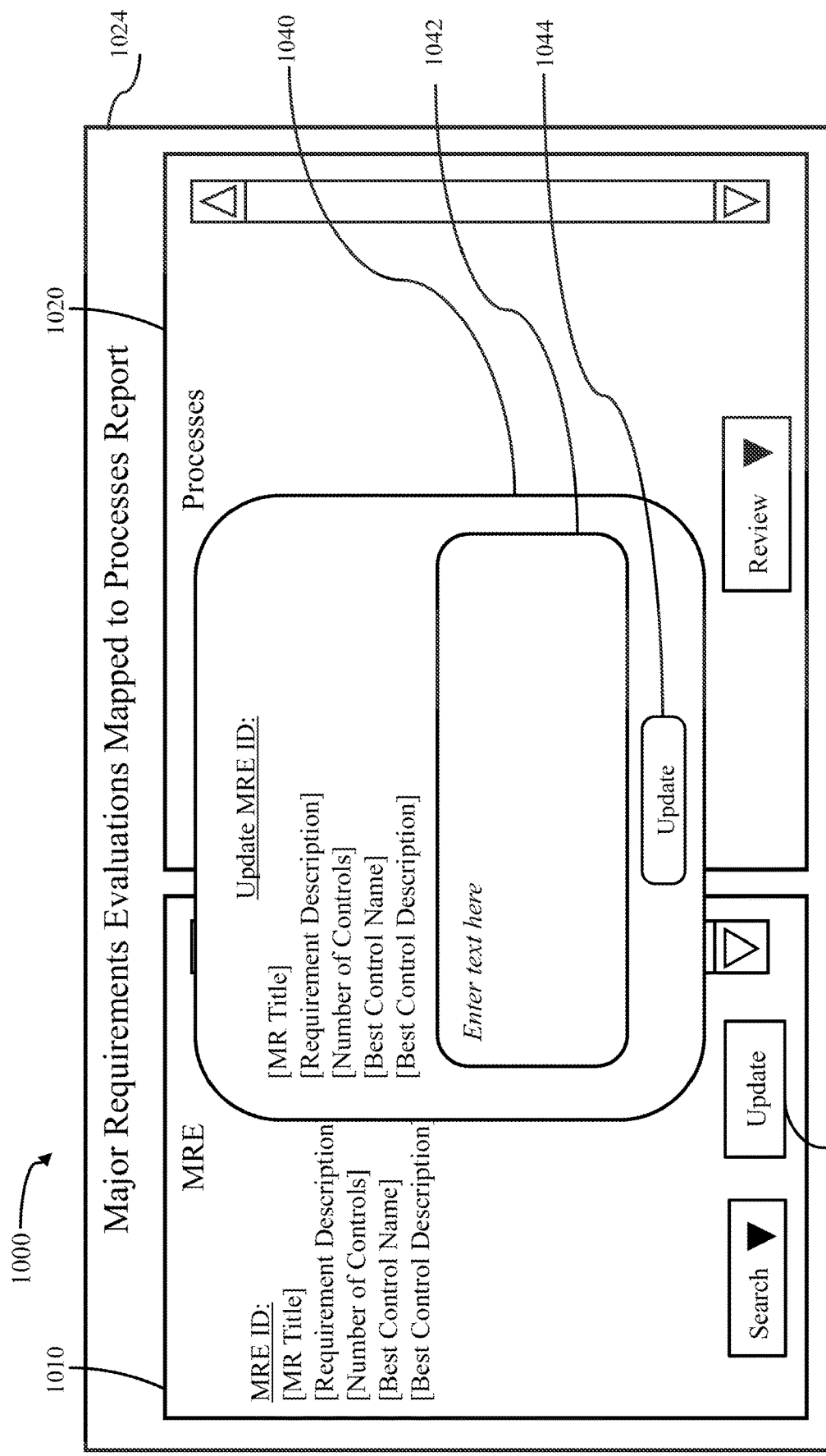
FIG. 10 depicts an example user interface displaying a modification of a particular requirement evaluation, according to potential embodiments.

Referring to FIG. 10, in the event the "Update" interactive button 1030 is interacted with, an "Update MRE ID" window 1040 may be displayed to a user. A user may use window 1040 to update one or more data fields associated with the MRE displayed in frame 1010. For example, data fields such as the MR Title, Requirements Description, Number of Controls, Best Control Name, and Best Control Description may be modified. The user may input updates directly into text box 1042. The user's interaction with the interactive "Update" button 1044 may trigger re-running the processes described herein (e.g., process 200 in FIG. 2, process 400 in FIG. 4, process 500 in FIG. 5, process 600 in FIG. 6 and/or process 800 in FIG. 8). In response to the re-running of the various processes described herein, window 1040 may close and new MREs and processes may be mapped based on the modifications to the one or more MRE data fields. The new MREs and mapped processes may be displayed in window 1024 in the MRE frame 1010 and process frame 1020 respectively.

Figure 11:
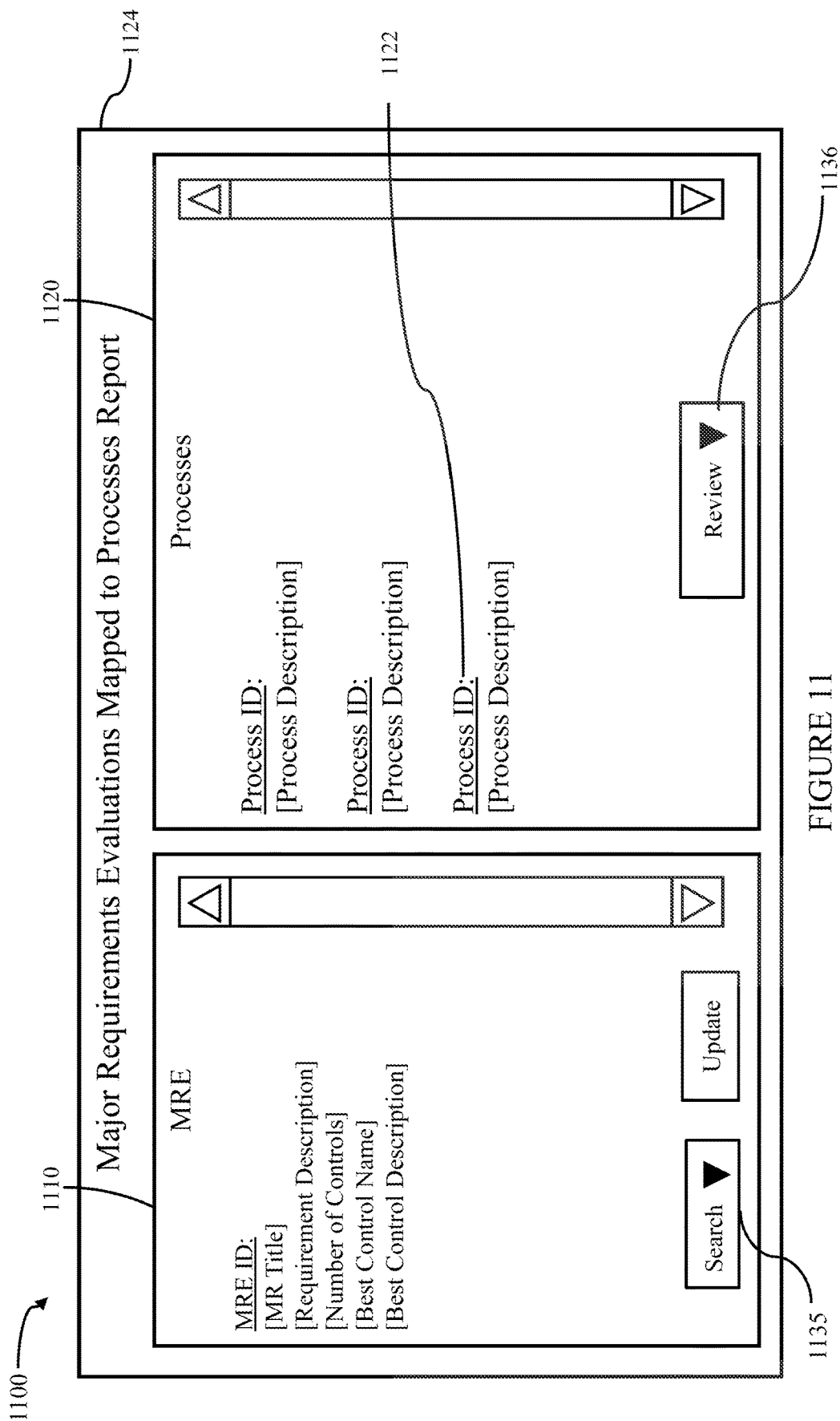
FIG. 11 depicts an example user interface displaying a newly generated mapping, according to potential embodiments.

Referring to FIG. 11, in the event a user has updated an MRE (e.g., using the Update MRE ID window 1040 in FIG. 10) or selected a different MRE using the interactive button 1135, the GUI 1100 may refresh based on the new mapping performed by processes described herein such that a new process ID 1122 is displayed. The new report indicated by 1124 includes the same MRE frame 1110 and Process frame 1120, but the frames have been updated. As illustrated, process ID 1122 was mapped to the MRE displayed in frame 1110 based on the changes implemented in the "Update MRE ID" window 1040 in FIG. 10.

A user may review one or more portions of the mapping. For instance, a user may interact with the interactive "Review" button 1136 to select a particular portion of the mapping to review. Interactive button 1136 may be a drop down menu with different mapping procedures (e.g., precision matching, concordance matching, text analytics) and associated assumptions with respect to the displayed map in window 1124.

Figure 12:
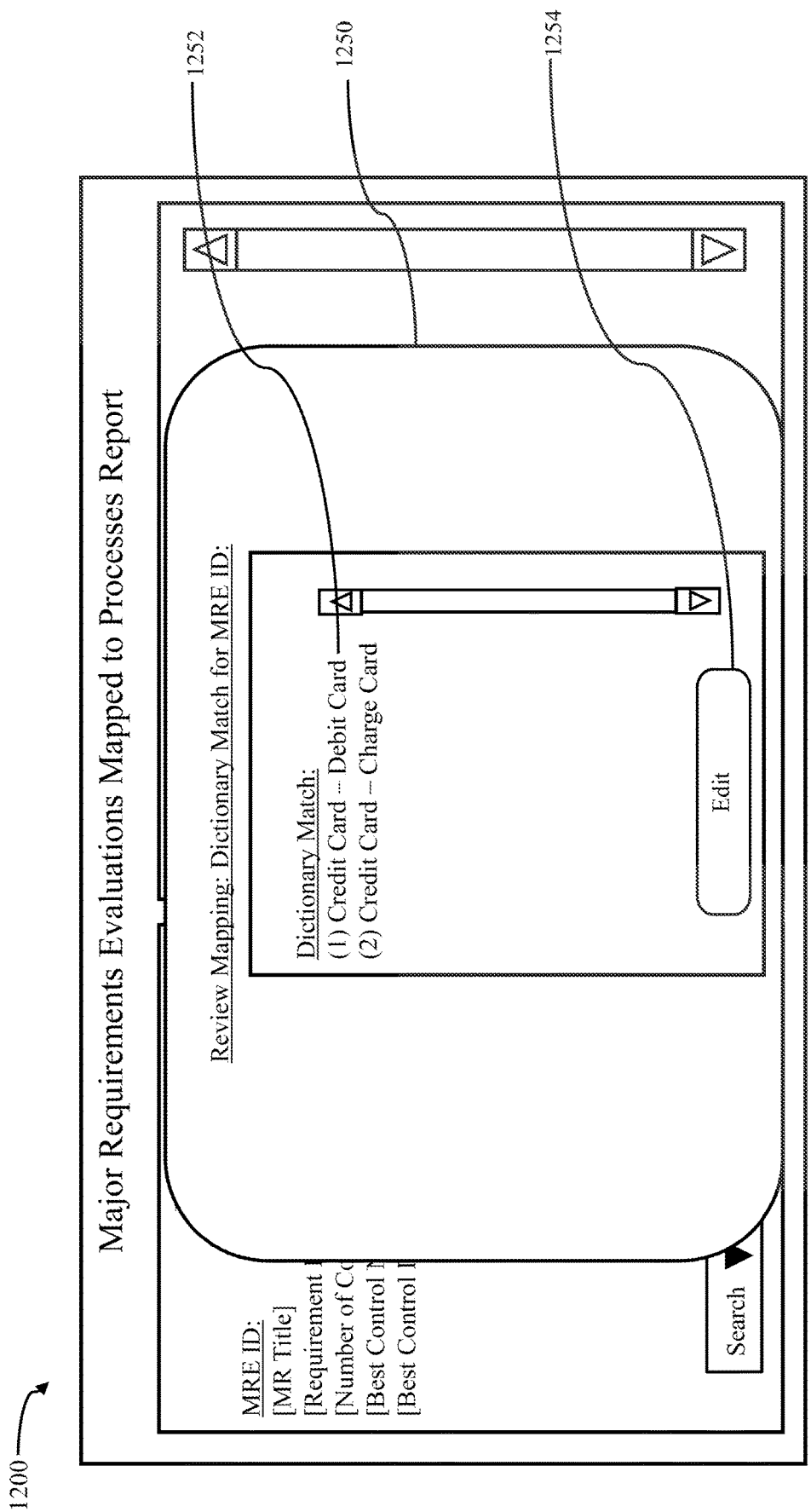
FIG. 12 depicts an example user interface displaying a review of the mapping approaches and associated mapping assumptions, according to potential embodiments.

Referring to FIG. 12, a particular portion of the mapping (the concordance matching portion) is displayed in a "Review" window 1250. The "Review" window 1250 may display the dictionary/concordance matching that was performed given particular MRE IDs and/or process IDs. That is, there may be a different dictionary associated with each MRE and/or process. In other embodiments, a global dictionary may be implemented such that each concordance mapped term associated with each MRE and/or process is stored in the global dictionary. A user may use the "Review" window 1250 to evaluate whether the concordance/dictionary matching was performed correctly. As shown, line 1252 is incorrect because a credit card is not analogous to a debit card. Accordingly, a user may interact with the interactive "Edit" button 1254.

Figure 13:
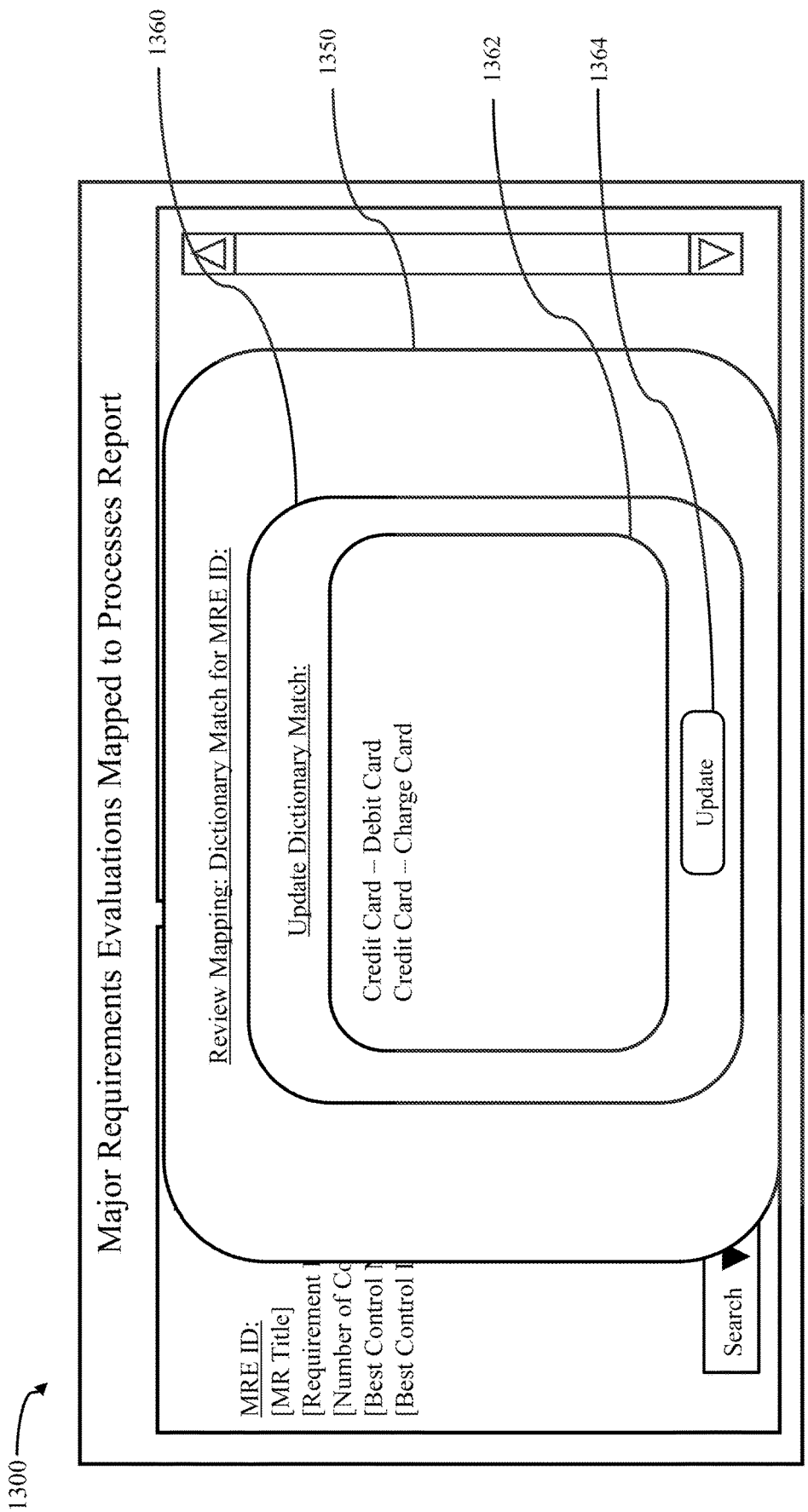
FIG. 13 depicts an example user interface modifying an assumption of the mapping approach, according to potential embodiments.

FIG. 13 is an example of a user modifying the incorrect data field (e.g., line 1252 in FIG. 12) An "Update" window 1360 may be displayed (e.g., overlaid on "Review" window 1350) to the user such that the user can modify the information in field 1362. The user may edit the text in field 1362 and interact with the interactive "Update" button 1364 to save the edits and re-run the process (e.g., process 200 in FIG. 2, process 400 in FIG. 4, process 500 in FIG. 5, process 600 in FIG. 6 and/or process 800 in FIG. 8) for a particular MRE and/or process. Alternatively, the processes described herein may be re-run for all of the MREs and/or processes based on the user edits.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

It is noted that terms such as "approximately," "substantially," "about," or the like may be construed, in various embodiments, to allow for insubstantial or otherwise acceptable deviations from specific values. In various embodiments, deviations of 20 percent may be considered insubstantial deviations, while in certain embodiments, deviations of 15 percent may be considered insubstantial deviations, and in other embodiments, deviations of 10 percent may be considered insubstantial deviations, and in some embodiments, deviations of 5 percent may be considered insubstantial deviations. In various embodiments, deviations may be acceptable when they achieve the intended results or advantages, or are otherwise consistent with the spirit or nature of the embodiments.

Example computing systems and devices may include one or more processing units each with one or more processors, one or more memory units each with one or more memory devices, and one or more system buses that couple various components including memory units to processing units. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated modules, units, and/or engines, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer system comprising one or more processors configured to:
    perform a machine learning operation on a plurality of first data entries in a first database and a plurality of second data entries in a second database, each of the first data entries comprising a first plurality of data fields, and each of the second data entries comprising a second plurality of data fields, the machine learning operation comprising:
        generating, by applying a set of text analytics operations to the first and second pluralities of data fields, similarity scores for the first and second pluralities of data fields, the set of text analytics operations comprising a plurality of latent semantic index (LSI), cosine similarity, FuzzyWuzzy operations, topic modeling with network regularization, word2vec, soft cosine similarity, doc2vec, latent Dirichlet allocation (LDA), Jensen-Shannon divergence, or Word Mover's Distance (WMD), the set of text analytics operations selected based at least in part on lengths of data fields in the first and second pluralities of data fields; and
        determining that a minimum number of the similarity scores exceeds one or more thresholds,
        wherein the similarity score includes a first similarity score determined based on similarity of an entirety of a string in the first and second pluralities of data fields and a second similarity score determined based on similarity of a portion of the string;
    verify a number of topics in a set of topics based on a comparison of the number of topics to a result of an n-gram analysis of the machine learning operation, wherein the number of topics indicates how many topics are in the set of topics;
    generate, based on (i) the minimum number of the similarity scores satisfying the one or more thresholds, and (ii) at least one of the set of topics or the number of topics, a mapping report connecting a first subset of the first data entries in the first database to a second subset of the second data entries in the second database; and
    display, on a display device, the mapping report indicating which ones of the first data entries are connected to which ones of the second data entries;
    wherein the mapping report is updated based on a user feedback, wherein the user feedback comprises one or more additions to data field descriptions by one or more users and one or more corrections to a mapping approach performed based on one or more assumptions, wherein the one or more corrections are to correct the one or more assumptions for the mapping approach, and wherein one or more connections corresponding to the mapping report are determined to be incorrect due to missing data field entries.

2. The computer system of claim 1, the one or more processors further configured to modify, based on the verifying the number of topics in the set of topics, at least one of (i) the set of topics, or (ii) the number of topics.

3. The computer system of claim 1, wherein the first and second pluralities of data fields comprise at least one of (i) an identifier data field, or (ii) a title field.

4. The computer system of claim 1, wherein the first and second pluralities of data fields comprise one or more descriptor fields.

5. The computer system of claim 1, wherein the set of text analytics operations further comprises at least one exact matching algorithm.

6. The computer system of claim 5, wherein the exact matching algorithm is performed by evaluating a match of one or more strings in the first plurality of data fields with one or more strings in the second plurality of data fields.

7. The computer system of claim 1, wherein the set of text analytics operations further comprises a dictionary matching algorithm that is performed by comparing one or more strings in the first plurality of data fields and one or more strings in the second plurality of data fields to a dictionary database, the dictionary database indicating that the one or more strings in the first plurality of data fields matches the one or more strings in the second plurality of data fields in meaning.

8. The computer system of claim 7, the one or more processors further configured to accept a user input modifying one or more entries in the dictionary to generate a modified dictionary, and re-performing at least part of the mapping operations using the modified dictionary.

9. The computer system of claim 1, wherein the plurality of text analytics operations comprises a combination of two or more members of a group consisting of Levenshtein distance, latent semantic index (LSI), cosine similarity, FuzzyWuzzy, n-gram analysis, topic modeling with network regularization, word2vec, soft cosine similarity, doc2vec, latent Dirichlet allocation (LDA), Jensen-Shannon divergence, and Word Mover's Distance (WMD), wherein the similarity scores are based on the combination.

10. The computer system of claim 1, wherein the plurality of text analytics operations comprises a combination of cosine similarity and at least one of word2vec, doc2vec, or LSI.

11. The computer system of claim 1, wherein the plurality of text analytics operations comprises a combination of LDA and Jensen-Shannon divergence.

12. The computer system of claim 1, wherein the similarity scores are based on similarities of first text strings in the first plurality of data fields and second text strings in the second plurality of data fields.

13. The computer system of claim 12, wherein the first and second text strings are user-entered free-form phrases.

14. The computer system of claim 1, wherein the similarity scores are generated based on a sum of a plurality of similarity scores generated from the machine learning operation, the plurality of similarity scores comprising two or more of a first similarity score that is based on one or more precision matching operations, a second similarity score that is based on one or more concordance matching operations, and a third similarity score that is based on one or more text analytics operations.

15. The computer system of claim 1, the one or more processors further configured to perform at least one of (i) a first filtering of at least one of the plurality of first data entries based on at least one data field in the first plurality of data fields, or (ii) a second filtering of at least one of the plurality of second data entries based on at least one data field in the second plurality of data fields.

16. The computer system of claim 15, wherein the first and second filtering are performed prior to the machine learning operation, and wherein the machine learning operation is based on the filtered first and second data entries.

17. A computer-implemented method comprising:
obtaining, from a first database of a first system, a set of requirements defined by a first set of data fields comprising a first plurality of user-entered free-form phrases;
obtaining, from a second database of a second system, a set of processes defined by a second set of data fields comprising a second plurality of user-entered free-form phrases;
generating, for each process in the set of processes, a subset of the set of requirements impacting the process by performing a machine learning operation configured to map processes to requirements, the machine learning operation configured to map processes to requirements in response to determining that a minimum number of similarity scores exceeds one or more thresholds, wherein the similarity score includes a first similarity score determined based on similarity of an entirety of a string in the first and second sets of data fields and a second similarity score determined based on similarity of a portion of the string, wherein the machine learning operation comprises applying a set of text analytics operations to the first and second pluralities of data fields, the set of text analytics operations comprising a plurality of latent semantic index (LSI), cosine similarity, FuzzyWuzzy operations, topic modeling with network regularization, word2vec, soft cosine similarity, doc2vec, latent Dirichlet allocation (LDA), Jensen-Shannon divergence, or Word Mover's Distance (WMD), the set of text analytics operations selected based at least in part on lengths of data fields in the first and second pluralities of data fields;
verifying a number of topics in a set of topics based on a comparison of the number of topics to a result of an n-gram analysis of the machine learning operation, wherein the number of topics indicates how many topics are in the set of topics;
displaying, on a display device, a mapping report linking the set of
requirements to the set of processes, the mapping report indicating which requirements are connected to which processes;
wherein the mapping report is updated based on a user feedback, wherein the user feedback comprises one or more additions to data field descriptions by one or more users and one or more corrections to a mapping approach performed based on one or more assumptions, wherein the one or more corrections are to correct the one or more assumptions for the mapping approach, and wherein one or more connections corresponding to the mapping report are determined to be incorrect due to missing data field entries.

18. The method of claim 17, further comprising modifying, based on the verification, at least one of (i) the set of topics, or (ii) the number of topics.

* * * * *